Patented May 23, 1933

1,910,137

UNITED STATES PATENT OFFICE

ARTHUR VAN DER BRUGGEN, OF PARIS, FRANCE

FURNITURE POLISH

No Drawing. Application filed June 11, 1928, Serial No. 284,662, and in France April 16, 1928.

This invention relates to a material for producing, restoring, and preserving the polish of furnitures, enamels, paintings and all surfaces to be glittered and the process for manufacturing said material.

This process consists essentially in mixing at a suitable temperature, nitrobenzene commonly known as essence of mirbane, acetone, nitro-cellulose in the form of collodion, wax and petroleum oil.

It is a known fact that hitherto it has been impossible to assimilate wax and nitro-cellulose in the form of collodion.

The present invention permits this assimilation by means of a solution of nitrobenzene and acetone, this solution forming the intermediary agent between the wax and the petroleum oil on the one hand and the nitro-cellulose on the other hand.

By means of this process a thoroughly homogeneous product is obtained in the form of a paste.

As an example only, one of the ways of carrying the invention into practical effect, is hereby given.

Mix in the under mentioned order, and while maintaining them at the melting temperature of wax:

|   | Grammes |
|---|---|
| 1. Nitrobenzene solution | 65 |
| Acetone | 10 |
| Pour in collodion | 20 |

Allow to thin out, that is, the ingredients entering into this initial mixture should be permitted to spread throughout the entire mixture in order to reduce the solution to a proper density.

|   | Grammes |
|---|---|
| 2. Melt wax | 40 |

Mix the solution 1 with the molten wax.

| 3. Take of petroleum oil | 30 |
|---|---|
| Add acetone | 3 |

4. Pour the solution 3 into the mixture containing the solution 1 and the molten wax. Allow the whole to settle.

Thus a product in the form of a paste is obtained, which when applied to polished surfaces, whether metallic or non-metallic, imparts to them an unequalled lustre.

It is to be understood that the proportions mentioned above for the purpose of explaining the invention are only given by way of example. They can be varied according to circumstances and according to the use and the application of the product.

Having now particularly described and ascertained the nature of my said invention and in what manner the same is to be performed, I declare that what I claim is:—

1. A process for the manufacture of a substance to revive and preserve varnished surfaces comprising the steps of thoroughly mixing at a melting temperature of wax, a solution of nitrobenzene, acetone and collodion; subsequently mixing said mixture with molten wax; adding acetone to petroleum oil; and finally mixing the acetone and petroleum oil to the solution of nitrobenzene, acetone, collodion and molten wax, leaving the whole to set.

2. A composition comprising collodion, nitrobenzene, acetone, petroleum oil, in combination with wax in proportions to provide a furniture polish.

In witness whereof I have hereunto set my hand.

ARTHUR VAN DER BRUGGEN.